(12) United States Patent
Lu

(10) Patent No.: US 6,378,238 B1
(45) Date of Patent: Apr. 30, 2002

(54) FISHING ROD STRUCTURE

(76) Inventor: Wu Shiung Lu, No. 1, Kabe 292, Sec. 2 Ya Tien Rd., Tien Tzu Hsiang, Taichung Hsien (TW)

( * ) Notice: Subject to any disclaimer, the term of this patent is extended or adjusted under 35 U.S.C. 154(b) by 2 days.

(21) Appl. No.: 09/671,185

(22) Filed: Sep. 28, 2000

(51) Int. Cl.[7] .............................................. A01K 87/00
(52) U.S. Cl. ........................... 43/18.1; 43/18.2; 43/22; 43/20; D22/142
(58) Field of Search ................................... 43/18.1, 22

(56) References Cited

U.S. PATENT DOCUMENTS

| | | | | |
|---|---|---|---|---|
| 4,802,299 A | * | 2/1989 | Ohmura | 43/22 |
| 5,522,169 A | * | 6/1996 | Heller | 43/23 |
| D425,170 S | * | 4/2000 | Ohmura | D22/142 |
| 6,067,740 A | * | 5/2000 | Alley | 43/22 |
| 6,105,301 A | * | 8/2000 | Ohmura | 43/22 |
| 6,151,826 A | * | 11/2000 | Grice | 43/22 |
| 6,158,089 A | * | 12/2000 | Monahan et al. | 16/429 |

* cited by examiner

*Primary Examiner*—Peter M. Poon
*Assistant Examiner*—Bethany L. Griles
(74) *Attorney, Agent, or Firm*—Rosenberg, Klein & Lee

(57) ABSTRACT

A fishing rod structure including a handle and a fixing seat disposed on front section of the handle for fixing a line winder. A front end of the fixing seat is formed with a thread section on which a movable seat is screwed for fixing the line winder. A toothed section axially extends from front end of the thread section. A fitting sleeve is fitted in a top section of the movable seat. An abutting member is disposed on a bottom section of the fitting sleeve. The abutting member protrudes from inner circumference of the fitting sleeve to abut against the toothed section.

2 Claims, 6 Drawing Sheets

FISHING ROD STRUCTURE

BACKGROUND OF THE INVENTION

The present invention relates to an improved fishing rod structure, and more particularly to a fishing rod in which the movable seat for fixing the line winder has simple structure and can be easily manufactured.

FIGS. 4 to 6 show a conventional fishing rod including a handle 81 and a fixing seat 82 mounted on the handle 81. The front end of the fixing seat 82 is formed with a thread section 83. The front end of the thread section 83 has a differential sect ion 84. A movable seat 9 is screwed on the thread section 83. A collar 91 is fixed on the front section of the movable seat 9 corresponding to the differential section 84. The collar 91 has a diameter larger than the maximum diameter of the differential section 84. A top section of the collar 91 is formed with a receptacle 92. The bottom face of the receptacle 92 is formed with a hole 93 in which an abutting pin 94 and a spring 95 are disposed. A disc member 97 is locked in the receptacle 92 by a fastening ring 96. The disc member 97 is formed with a central differential hole 971 complementary to the differential section 84. The disc member 97 has a toothed bottom face 972. The abutting pin 94 is pushed by the spring 95 to abut against the toothed face 972 of the disc member 97. The differential section 84 is inserted into the differential hole 971 of the disc member 97 to restrict the disc member 97 from rotating. When rotating the movable seat 9, the collar 91 is driven to rotate. At this time, the abutting pin 94 abrades the toothed face 972 of the disc member 97 to increase the frictional resistance so as to avoid loosening. In addition, when rotating the movable seat 9 for tightly clamping the line winder, the tightening travel of the movable seat 9 can be judged by means of the number of the sound emitted by the rotated movable seat 9 so as to identify the tightness of the line winder clamped by the movable seat 9.

According to the above arrangement, the hole 93 of the collar 91 of the movable seat 9, the abutting pin 94 and the spring 95 all have very small size so that it is uneasy to manufacture and process these components and the manufacturing cost is relatively high. Moreover, it is uneasy to assemble these tiny components and it often takes place that some of the components miss or are neglected when installed.

SUMMARY OF THE INVENTION

It is therefore a primary object of the present invention to provide an improved fishing rod structure including a handle and a fixing seat disposed on front section of the handle for fixing a line winder. A toothed section axially extends from front end of the thread section. A fitting sleeve is fitted in a top section of the movable seat. An abutting member is disposed on a bottom section of the fitting sleeve. The abutting member protrudes from inner circumference of the fitting sleeve to abut against the toothed section so as to increase the frictional resistance. The fishing rod has less components and simple structure so that the fishing rod can be easily manufactured and assembled. Therefore, the manufacturing cost is lowered.

The present invention can be best understood through the following description and accompanying drawings wherein:

DETAILED DESCRIPTION OF THE PREFERRED EMBODIMENT

Figure 1:
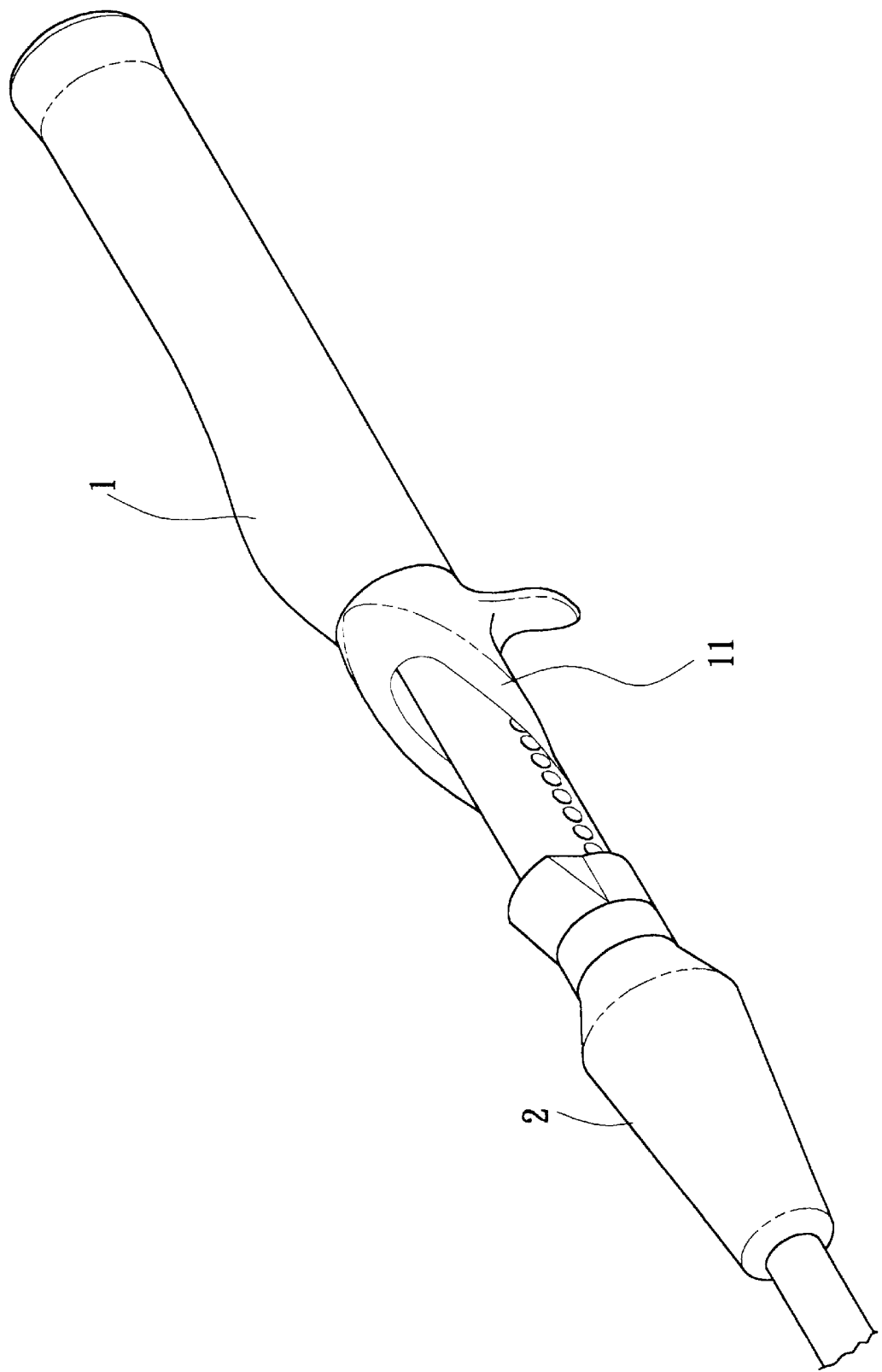
FIG. 1 is a perspective assembled view of the fishing rod structure of the present invention.
Figure 2:
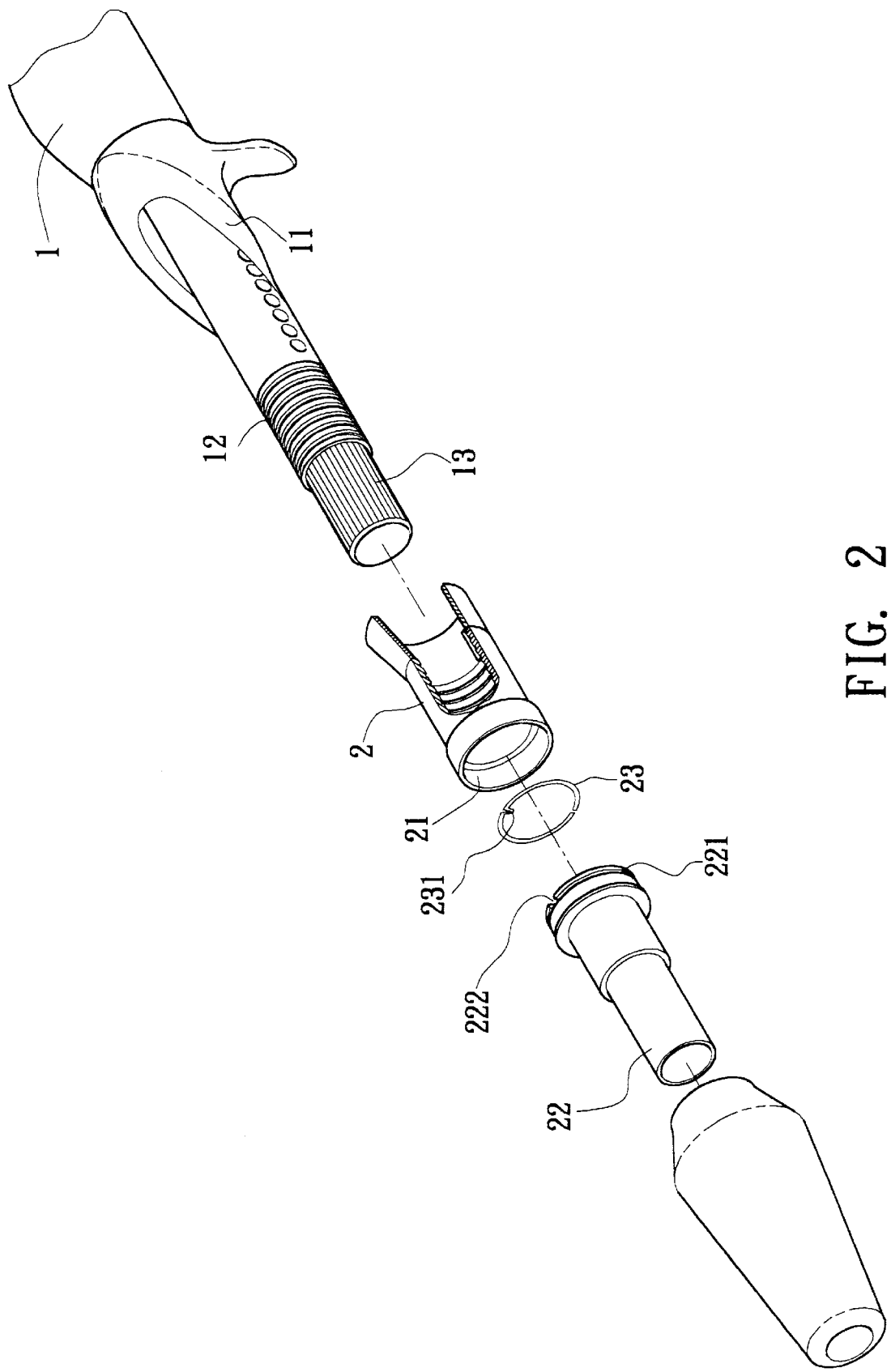
FIG. 2 is a perspective exploded view of the fishing rod structure of the present invention.
Figure 3:
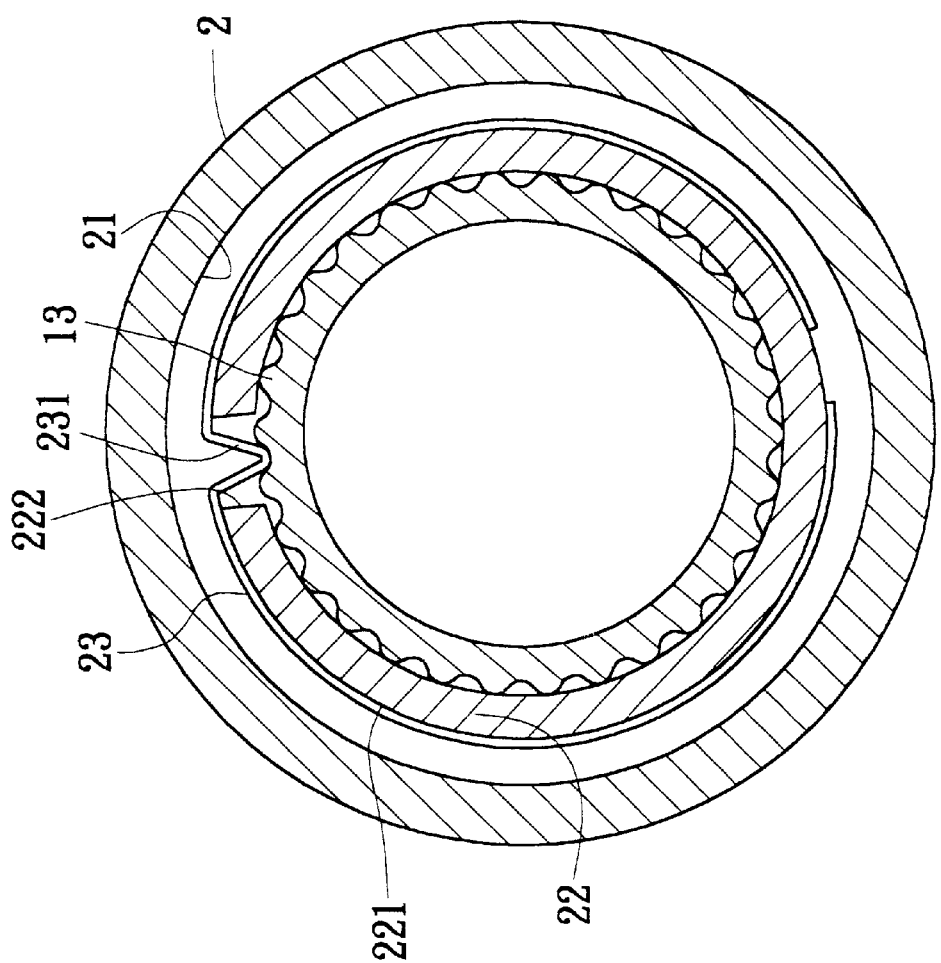
FIG. 3 is a sectional view taken along line III—III of FIG. 1.
Figure 4:
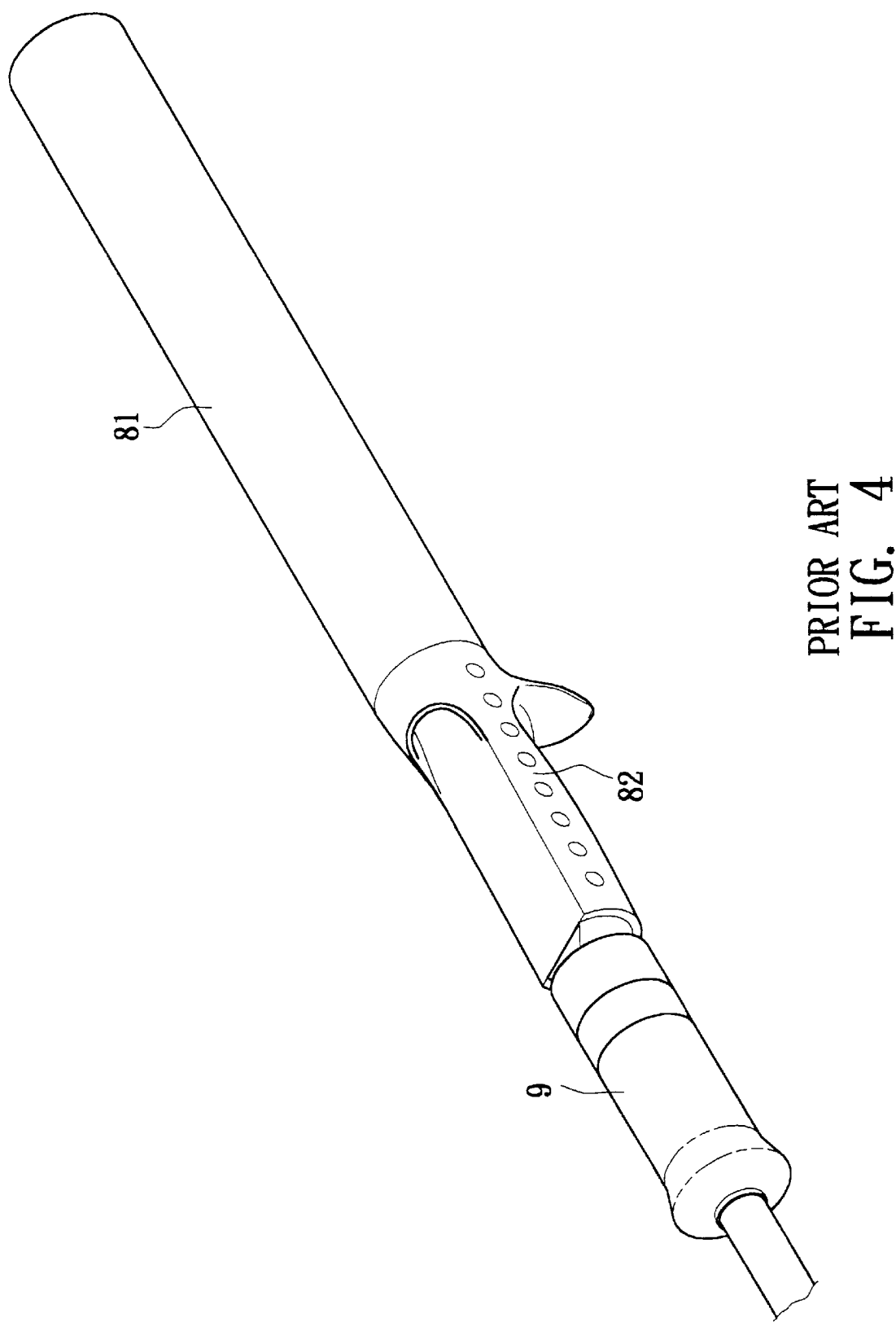
FIG. 4 is a perspective assembled view of a conventional fishing rod.
Figure 5:
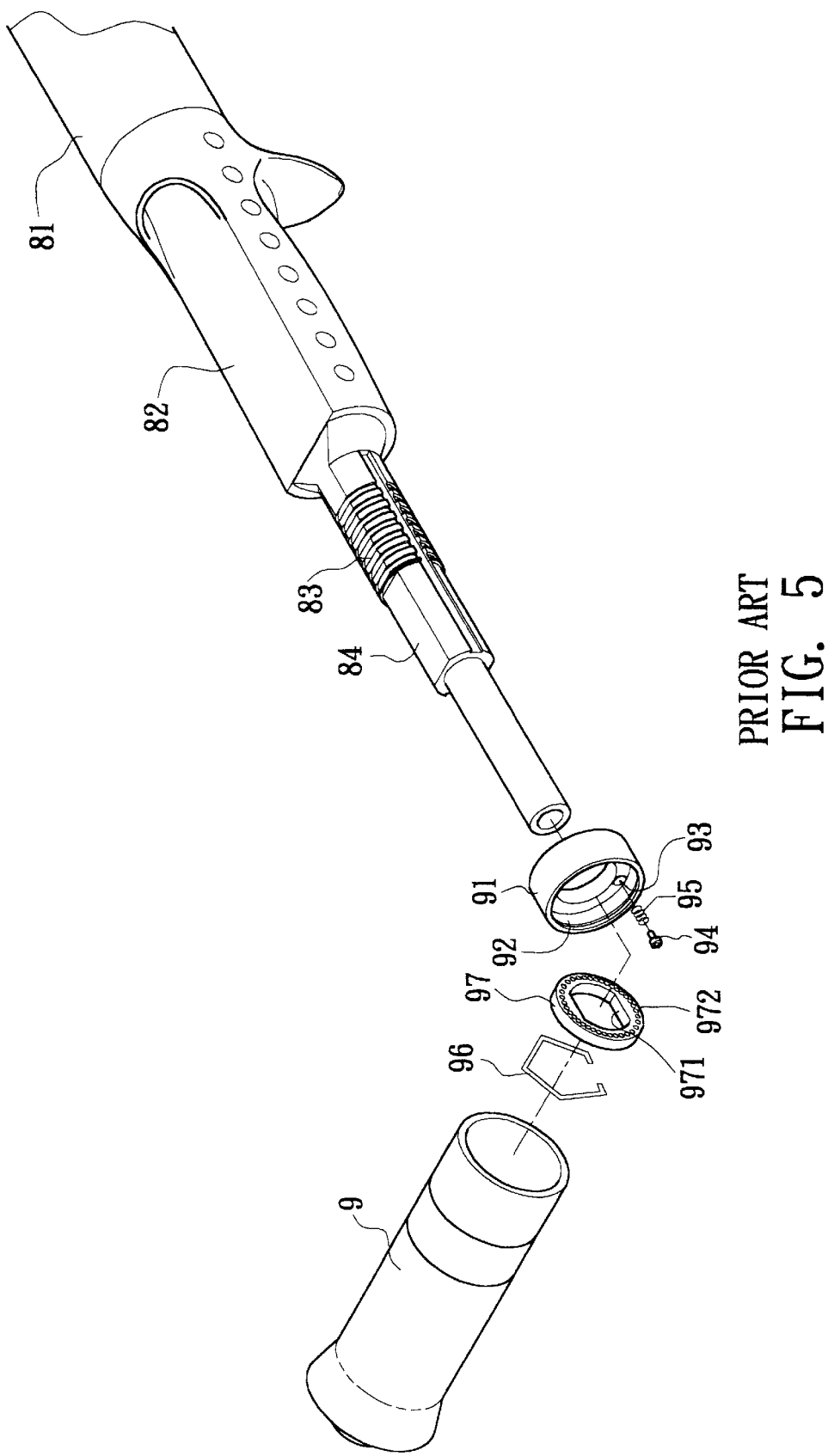
FIG. 5 is a perspective exploded view of the conventional fishing rod.
Figure 6:
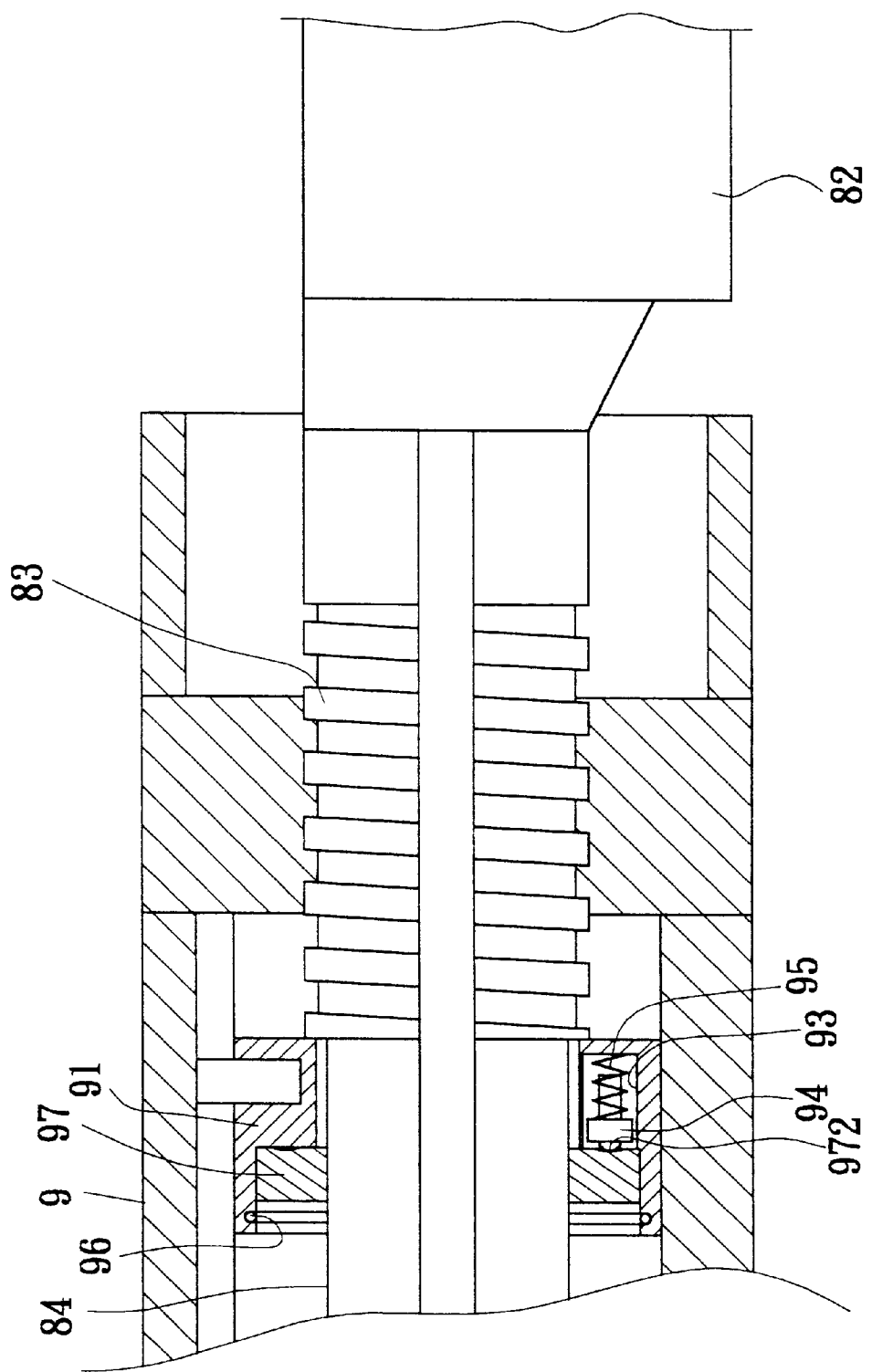
FIG. 6 is a sectional view of the conventional fishing rod.

Please refer to FIGS. 1 to 3. The fishing rod structure of the present invention includes a handle 1 and a fixing seat 11 disposed on front section of the handle 1 for fixing a line winder. The front end of the fixing seat 11 is formed with a thread section 12 on which a movable seat 2 is screwed. A toothed section 13 axially extends from front end of the thread section 12. A top section of the movable seat 2 is formed with a connecting section 21 in which a fitting sleeve 22 is fitted. An outer circumference of bottom section of the fitting sleeve 22 is formed with an annular groove 221 corresponding to the toothed section 13. The bottom section of the fitting sleeve 22 is formed with a notch 222. A resilient fitting ring 23 is disposed in the annular groove 221. The resilient fitting ring 23 has a middle inward projecting section 231 which protrudes from inner circumference of the fitting sleeve 22 through the notch 222 to abut against the toothed section 13.

When rotating the movable seat 2, the resilient fitting ring 23 is driven by the fitting sleeve 22 to rotate. At this time, the projecting section 231 of the fitting ring 23 will abut against the toothed section 13 to create greater resistance and thus avoid loosening. In addition, when rotating the movable seat 2, a sound is emitted. The tightening travel of the movable seat 2 can be judged by means of the number of the sound so as to identify the tightness of the line winder clamped by the movable seat 2.

The toothed section 13 of the handle 1 and the fitting sleeve 22 are both made by injection molding. The resilient fitting ring 23 is a resilient member with simple shape. The present invention includes less components and thus can be quite easily manufactured and assembled. Therefore, the manufacturing cost is lowered.

The above embodiment is only used to illustrate the present invention, not intended to limit the scope thereof. Many modifications of the above embodiment can be made without departing from the spirit of the present invention.

What is claimed is:

1. A fishing rod structure comprising a handle and a fixing seat disposed on front section of the handle for fixing a line winder, a front end of the fixing seat being formed with a thread section on which a movable seat is screwed for fixing the line winder, said fishing rod structure being characterized in that a toothed section axially extends from front end of the thread section, a top section of the movable seat being formed with a connecting section in which a fitting sleeve is fitted, an abutting member being disposed on a bottom section of the fitting sleeve, the abutting member protruding from inner circumference of the fitting sleeve to abut against the toothed section.

2. A fishing rod structure as claimed in claim 1, wherein an outer circumference of the bottom section of the fitting sleeve is formed with an annular groove, the bottom section of the fitting sleeve being formed with a notch, the abutting member being a resilient fitting ring disposed in the annular groove, the resilient fitting ring having a middle inward projecting section which protrudes from inner circumference of the fitting sleeve through the notch to abut against the toothed section.

* * * * *